United States Patent
Nomaguchi

(10) Patent No.: US 11,339,276 B2
(45) Date of Patent: May 24, 2022

(54) RUBBER COMPOSITION AND PNEUMATIC TIRE

(71) Applicant: The Yokohama Rubber Co., LTD., Tokyo (JP)

(72) Inventor: Tsuyoshi Nomaguchi, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 16/618,389

(22) PCT Filed: May 30, 2018

(86) PCT No.: PCT/JP2018/020778
§ 371 (c)(1),
(2) Date: Dec. 1, 2019

(87) PCT Pub. No.: WO2018/221595
PCT Pub. Date: Dec. 6, 2018

(65) Prior Publication Data
US 2020/0407535 A1 Dec. 31, 2020

(30) Foreign Application Priority Data
Jun. 1, 2017 (JP) .............................. JP2017-109545

(51) Int. Cl.
| | | |
|---|---|---|
| *C08L 9/00* | (2006.01) |
| *B60C 15/06* | (2006.01) |
| *C08K 3/04* | (2006.01) |
| *C08K 5/44* | (2006.01) |
| *C08K 11/00* | (2006.01) |
| *B60C 1/00* | (2006.01) |

(52) U.S. Cl.
CPC ............... *C08L 9/00* (2013.01); *B60C 15/06* (2013.01); *C08K 3/04* (2013.01); *C08K 5/44* (2013.01); *C08K 11/005* (2013.01); *B60C 2001/005* (2013.01); *C08K 2201/008* (2013.01)

(58) Field of Classification Search
CPC .. C08L 9/00; B60C 15/06; C08K 3/04; C08K 5/44
USPC ....................................................... 523/155
See application file for complete search history.

(56) References Cited

U.S. PATENT DOCUMENTS

| | | | |
|---|---|---|---|
| 5,430,087 A * | 7/1995 | Carlson | |
| 5,772,807 A | 6/1998 | Fourgon | |
| 2011/0190416 A1* | 8/2011 | Maesaka | C08K 3/30 523/155 |
| 2014/0090764 A1 | 4/2014 | Miyazaki | |
| 2014/0196828 A1 | 7/2014 | Miyazaki | |
| 2014/0202609 A1 | 7/2014 | Miyazaki | |
| 2015/0240060 A1 | 8/2015 | Wada | |
| 2016/0311257 A1 | 10/2016 | Miyazaki | |
| 2017/0015812 A1 | 1/2017 | Miyazaki et al. | |
| 2017/0158846 A1* | 6/2017 | Tanabe | C08L 9/06 |

FOREIGN PATENT DOCUMENTS

| | | |
|---|---|---|
| EP | 2 743 303 | 6/2014 |
| EP | 3 081 588 | 10/2016 |
| JP | H10-100612 | 4/1998 |
| JP | 2007-302715 | * 11/2007 |
| JP | 2009-242577 | 10/2009 |
| JP | 2011-046299 | 3/2011 |
| JP | 2013-237337 | 11/2013 |
| JP | 2014-031425 | 2/2014 |
| JP | 2015-101666 | 6/2015 |
| JP | 6068987 | 1/2017 |
| WO | WO 2013/008798 | 1/2013 |
| WO | WO 2013/046804 | 4/2013 |
| WO | WO 2014/020909 | 2/2014 |
| WO | WO 2015/104932 | 7/2015 |
| WO | WO 2015/145843 | 10/2015 |
| WO | WO 2015/199123 | * 12/2015 |

OTHER PUBLICATIONS

Machine translation of JP 2007-302715 (Year: 2007).*
International Search Report for International Application No. PCT/JP2018/020778 dated Sep. 4, 2018, 4 pages, Japan.

* cited by examiner

*Primary Examiner* — Doris L Lee
(74) *Attorney, Agent, or Firm* — Thorpe North & Western

(57) ABSTRACT

The present technology provides a rubber composition having: from 30 to 50 parts by mass of carbon black having a nitrogen adsorption specific surface area of from 100 to 130 $m^2/g$, from 25 to 40 parts by mass of carbon black having a nitrogen adsorption specific surface area of from 37 to 60 $m^2/g$, from 1.5 to 2.2 parts by mass of sulfur as a pure sulfur content, and from 110 to 200 mass % of a sulfenamide-based vulcanization accelerator relative to the pure sulfur content compounded in 100 parts by mass of diene rubber containing from 30 to 60 parts by mass of isoprene rubber and from 40 to 70 parts by mass of butadiene rubber.

11 Claims, No Drawings

RUBBER COMPOSITION AND PNEUMATIC TIRE

TECHNICAL FIELD

The present technology relates to a rubber composition and a pneumatic tire, and particularly relates to a rubber composition and a pneumatic tire that suppresses vulcanization temperature dependency of physical properties of rubber without deteriorating the heat build-up and improve hardness and physical breakage properties simultaneously.

BACKGROUND ART

A rim cushion is provided on the outer surface of a bead portion to a side portion of a pneumatic tire in a manner that the rim cushion is in close contact with a rim when the tire is mounted on a rim of a wheel. The rim cushion is required to have a high rubber hardness in order to support the load of the vehicle and to ensure steering stability. The rim cushion is also required to have excellent physical breakage properties in terms of maintaining the tire internal pressure.

On the other hand, with the recent increase of environmental consciousness, it is desirable to make the tire have low heat build-up properties.

In prior art, for the purpose of improving rubber hardness and low heat build-up properties at the same time, for example, Japan Patent No. 6068987 described below discloses a rubber composition for canvas chafer that includes isoprene rubber, carbon black having a nitrogen adsorption specific surface area of from 65 to 200 $m^2/g$, and sulfur, the compounded amount of the isoprene rubber being from 25 to 80 mass % and the compounded amount of the butadiene rubber being 40 mass % or less in 100 mass % of the rubber component, the compounded amount of the carbon black being from 40 to 80 parts by mass, and the compounded amount of the sulfur being from 1.0 to 2.7 parts by mass in 100 parts by mass of the rubber component, thereby improving rim chafing resistance, rim damage resistance, processability, and low heat build-up properties.

Furthermore, Japan Unexamined Patent Publication No. 2014-031425 described below discloses a rubber composition including carbon black (1) having a nitrogen adsorption specific surface area of 35 $m^2/g$ or more and less than 50 $m^2/g$ and carbon black (2) having a nitrogen adsorption specific surface area of 50 $m^2/g$ or more and 95 $m^2/g$ or less in specific amounts in a butadiene rubber having specific properties, thereby improving low heat build-up properties, hardness, wear resistance, and set resistance.

However, physical properties of rubber are known to have vulcanization temperature dependency, and there is a problem that the hardness decreases when the vulcanization temperature is increased. Therefore, in order to improve the hardness and low heat build-up properties at the same time, the vulcanization temperature must be lowered, which has been a major limitation in the production of rubber compositions.

SUMMARY OF TECHNOLOGY

The present technology provides a rubber composition and a pneumatic tire that suppress vulcanization temperature dependency of physical properties of rubber without diminishing heat build-up and improve hardness and physical breakage properties simultaneously.

The inventors, as a result of diligent research, discovered compounding specific amounts of two kinds of carbon black having specific nitrogen adsorption specific surface areas ($N_2SA$), sulfur, and a sulfenamide-based vulcanization accelerator in diene rubber having a specific composition.

The present technology is described below.

1. A rubber composition including from 30 to 50 parts by mass of carbon black (1) having a nitrogen adsorption specific surface area of from 100 to 130 $m^2/g$, from 25 to 40 parts by mass of carbon black (2) having a nitrogen adsorption specific surface area of from 37 to 60 $m^2/g$, from 1.5 to 2.2 parts by mass of sulfur as a pure sulfur content, and from 110 to 200 mass % of a sulfenamide-based vulcanization accelerator relative to the pure sulfur content in 100 parts by mass of diene rubber containing from 30 to 60 parts by mass of an isoprene rubber and from 40 to 70 parts by mass of butadiene rubber.

2. The rubber composition according to 1, in which a hardness Hs (170) when the rubber composition is vulcanized for 10 minutes at 170° C. is from 68 to 72, a hardness Hs (180) when the rubber composition is vulcanized for 10 minutes at 180° C. is from 67 to 71, and a difference between the Hs (170) and the Hs (180) is 3 or less.

3. The rubber composition according to 1, which includes from 40 to 60 parts by mass of isoprene rubber and from 40 to 60 parts by mass of butadiene rubber when a total amount of the diene rubber is 100 parts by mass.

4. The rubber composition according to 1, in which the nitrogen adsorption specific surface area of the carbon black (1) is from 115 to 125 $m^2/g$.

5. The rubber composition according to 1, in which the nitrogen adsorption specific surface area of the carbon black (2) is from 40 to 49 $m^2/g$.

6. The rubber composition according to 1, in which the sulfenamide-based vulcanization accelerator is N-cyclohexyl-2-benzothiazolyl sulfenamide, N-tert-butyl-2-benzothiazolyl sulfenamide, or N,N'-dicyclohexyl-2-benzothiazolyl sulfenamide.

7. The rubber composition according to 1, which is used for a tire rim cushion.

8. A pneumatic tire including the rubber composition described in 7 in a rim cushion.

The present technology provides a rubber composition and a pneumatic tire that can suppress the vulcanization temperature dependency of physical properties of rubber and improve hardness and physical breakage properties at the same time without deteriorating heat build-up properties, by compounding two kinds of carbon black, sulfur, and a sulfenamide-based vulcanization accelerator having a specific nitrogen adsorption specific surface area ($N_2SA$) in specific amounts in a diene rubber having a specific composition.

DETAILED DESCRIPTION

The present technology will be described in further detail below.

Diene Rubber

The diene rubber used in an embodiment of the present technology includes isoprene rubber and butadiene rubber (BR) as essential components. Examples of the isoprene rubber include various natural rubbers (NR), epoxidized natural rubber, and various synthetic polyisoprene rubbers (IR).

In an embodiment of the present technology, when the total amount of the diene rubber is 100 parts by mass, it must contain from 30 to 60 parts by mass of isoprene rubber and from 40 to 70 parts by mass of butadiene rubber. If the amount of the isoprene rubber is less than 30 parts by mass, elongation at break and heat build-up will deteriorate, while the amount is greater than 60 parts by mass, the vulcanization temperature dependency of physical properties of rubber will deteriorate.

In an embodiment of the present technology, when the total amount of the diene rubber is 100 parts by mass, the compounded amount of the isoprene rubber is preferably from 40 to 60 parts by mass, and the compounded amount of the butadiene rubber is preferably from 40 to 60 parts by mass.

(Carbon Black CB)

The rubber composition according to an embodiment of the present technology must include both carbon black (1) having a nitrogen adsorption specific surface area ($N_2SA$) of from 100 to 130 $m^2/g$ and carbon black (2) having a nitrogen adsorption specific surface area ($N_2SA$) of from 37 to 60 $m^2/g$, thereby exhibiting its effect.

The nitrogen adsorption specific surface area ($N_2SA$) of the carbon black (1) is more preferably from 115 to 125 $m^2/g$ from the perspective of improving the effect of the present technology.

Furthermore, the nitrogen adsorption specific surface area ($N_2SA$) of the carbon black (2) is more preferably from 40 to 49 $m^2/g$ from the perspective of improving the effect of the present technology.

The nitrogen adsorption specific surface area ($N_2SA$) is a value calculated in accordance with JIS (Japanese Industrial Standard) K6217-2.

(Sulfenamide-Based Vulcanization Accelerator)

The sulfenamide-based vulcanization accelerator used in an embodiment of the present technology may be commercially available and known compounds, and specific examples include N-cyclohexyl-2-benzothiazolyl sulfenamide, N-tert-butyl-2-benzothiazolyl sulfenamide, and N,N'-dicyclohexyl-2-benzothiazolyl sulfenamide. N-cyclohexyl-2-benzothiazolyl sulfenamide is available from Ouchi Shinko Chemical Industrial Co., Ltd. under the trade name NOCCELER CZ-G, and N-tert-butyl-2-benzothiazolyl sulfenamide is available from Ouchi Shinko Chemical Industrial Co., Ltd. under the trade name NOCCELER NS-P.

(Compounding Ratio of Rubber Composition)

The rubber composition according to an embodiment of the present technology includes from 30 to 50 parts by mass of carbon black (1) having a nitrogen adsorption specific surface area of from 100 to 130 $m^2/g$, from 25 to 40 parts by mass of carbon black (2) having a nitrogen adsorption specific surface area of 37 to 60 $m^2/g$, from 1.5 to 2.2 parts by mass of sulfur as a pure sulfur content, and from 110 to 200 mass % of a sulfenamide-based vulcanization accelerator relative to the pure sulfur content in 100 parts by mass of the diene rubber.

If the compounded amount of the carbon black (1) is less than 30 parts by mass, the hardness decreases. On the other hand, if the compounded amount is greater than 50 parts by mass, the heat build-up and physical breakage properties deteriorate.

If the compounded amount of the carbon black (2) is less than 25 parts by mass, the heat build-up and physical breakage properties deteriorate. On the other hand, if the compounded amount is greater than 40 parts by mass, the hardness decreases.

When the compounded amount of the pure sulfur content is less than 1.5 parts by mass, the heat build-up deteriorates. On the other hand, if the compounded amount is greater than 2.2 parts by mass, the physical breakage properties deteriorate.

If the compounded amount of the sulfenamide-based vulcanization accelerator relative to the pure sulfur content is less than 110 mass %, the heat build-up deteriorates. On the other hand, if the compounded amount is greater than 200 mass %, the physical breakage properties deteriorate.

The compounded amount of the carbon black (1) is more preferably from 30 to 45 parts by mass relative to 100 parts by mass of the diene rubber.

The compounded amount of the carbon black (2) is more preferably from 25 to 35 parts by mass relative to 100 parts by mass of the diene rubber.

The compounded amount of sulfur is more preferably from 1.7 to 2.2 parts by mass as the pure sulfur content.

The compounded amount of the sulfenamide-based vulcanization accelerator is more preferably from 120 to 150 mass % relative to the pure sulfur content.

In addition to the aforementioned components, the rubber composition according to an embodiment of the present technology can also contain various kinds of additives that are commonly added for other rubber compositions, such as vulcanizing or crosslinking agents, vulcanizing or crosslinking accelerators, various kinds of fillers, various kinds of oils, anti-aging agents, plasticizers, and the like. The additives may be kneaded in according to a common method and used in vulcanizing or crosslinking. Compounded amounts of these additives may be any known standard compounded amount, so long as the object of the present technology is not hindered.

The rubber composition according to an embodiment of the present technology can suppress the vulcanization temperature dependency of the physical properties of rubber.

For example, the hardness Hs (170) when the rubber composition is vulcanized for 10 minutes at 170° C. can be from 68 to 72, and the hardness Hs (180) when the rubber composition is vulcanized for 10 minutes at 180° C. can be from 67 to 71. Additionally, the difference between the Hs (170) and the Hs (180) can be 3 or less, so that the vulcanization temperature dependency of the physical properties of rubber is remarkably suppressed. The hardness Hs in the present technology is measured at 20° C. in accordance with JIS K6253.

Furthermore, a wide range of vulcanization conditions can be employed for the rubber composition according to an embodiment of the present technology. For example, vulcanization conditions at a temperature of from 140 to 190° C. and a vulcanization time of from 5 minutes to 60 minutes can be employed.

Additionally, the rubber composition according to an embodiment of the present technology can improve the hardness, heat build-up, and physical breakage properties at the same time, and thus is preferably used as a rubber composition for use in tire applications, particularly for tire rim cushions. Additionally, the rubber composition according to an embodiment of the present technology can be used to manufacture a pneumatic tire according to a known method for manufacturing pneumatic tires.

Example

The present technology will be described in further detail by way of examples and comparative examples, but the present technology is not limited by these examples.

Examples 1 to 9 and Comparative Examples 1 to 13

According to the composition (part by mass) shown in Tables 1 and 2, the components other than the vulcanization accelerator and sulfur were kneaded for 5 minutes in a 1.7-L sealed Banbury Mixer. The vulcanization accelerator and sulfur were then added to the mixture and further kneaded to obtain a rubber composition. Next, the rubber composition thus obtained was pressure vulcanized in a predetermined mold at 170° C. for 10 minutes to obtain a vulcanized rubber test sample, and then the test methods shown below were used to measure the physical properties thereof.

Hardness Hs: Measured at 20° C. in accordance with JIS K6253. The hardness Hs (170) when the rubber composition was vulcanized for 10 minutes at 170° C. and the hardness Hs (180) when the rubber composition was vulcanized for 10 minutes at 180° C. were measured. In addition, the difference between the Hs (170) and the Hs (180) was determined.

Elongation at break: The elongation at break was tested at room temperature in accordance with JIS K 6251. The results are shown as an index with the value of Comparative Example 2 being 100. Larger values indicate superior elongation at break.

tan δ (60° C.): The tan δ (60° C.) was measured using a viscoelasticity spectrometer (available from Toyo Seiki Seisaku-sho, Ltd.) under the following conditions: 10% initial strain, +/−2% amplitude, 20 Hz frequency, and 60° C. temperature. The results are shown as an index with the value of Comparative Example 2 being 100. Smaller index values indicate lower heat build-up.

Tire rolling resistance (RRC): The tire rolling resistance was tested at 80 km/h in accordance with JIS D4324:2009 and conditions for a passenger vehicle. The results are expressed as index values with Comparative Example 2 being assigned the index value of 100. A smaller index value indicates lower rolling resistance.

The results are shown in Tables 1 and 2.

TABLE 1

|  | Comparative Example 1 | Comparative Example 2 | Example 1 | Example 2 | Example 3 |
|---|---|---|---|---|---|
| NR | 50 | 50 | 50 | 50 | 30 |
| BR1 |  |  |  |  | 70 |
| BR2 | 50 |  |  | 50 |  |
| BR3 |  | 50 | 50 |  |  |
| CB1 | 50 |  | 40 | 40 | 40 |
| CB2 |  | 20 |  |  |  |
| CB3 | 30 |  |  |  |  |
| CB4 |  | 60 | 30 | 30 | 30 |
| Oil | 10 | 1 | 5 | 5 | 5 |
| Anti-aging agent 1 | 2 | 2 | 2 | 2 | 2 |
| Anti-aging agent 2 | 1 | 1 | 1 | 1 | 1 |
| Wax | 1 | 1 | 1 | 1 | 1 |
| Stearic acid | 2 | 2 | 2 | 2 | 2 |
| Zinc oxide | 3 | 3 | 3 | 3 | 3 |
| Vulcanization accelerator 1 | 1.2 | 1.2 | 2.4 | 2.4 | 2.4 |
| Vulcanization accelerator 2 |  |  |  |  |  |
| Insoluble sulfur | 3 | 3 | 2.2 | 2.2 | 2.2 |
| Total | 203.2 | 194.2 | 188.6 | 188.6 | 188.6 |
| Pure sulfur content | 2.4 | 2.4 | 1.76 | 1.76 | 1.76 |
| Accelerator/pure sulfur content (%) | 50 | 50 | 136 | 136 | 136 |
| Hs (170) | 72 | 70 | 70 | 70 | 70 |
| Hs (180) | 68 | 65 | 68 | 68 | 69 |
| Hs (170) - Hs (180) | 4 | 5 | 2 | 2 | 1 |
| Elongation at break | 120 | 100 | 120 | 110 | 105 |
| tan δ (60° C.) | 190 | 100 | 95 | 95 | 100 |
| RRC | 105 | 100 | 98 | 98 | 99 |

|  | Example 4 | Comparative Example 3 | Example 5 | Comparative Example 4 | Comparative Example 5 |
|---|---|---|---|---|---|
| NR | 50 | 70 | 50 | 50 | 50 |
| BR1 | 50 | 30 | 50 | 50 | 50 |
| BR2 |  |  |  |  |  |
| BR3 |  |  |  |  |  |
| CB1 | 40 | 40 | 35 | 20 | 55 |
| CB2 |  |  |  |  |  |
| CB3 |  |  |  |  |  |
| CB4 | 30 | 30 | 30 | 50 | 20 |
| Oil | 5 | 5 | 1 | 5 | 5 |
| Anti-aging agent 1 | 2 | 2 | 2 | 2 | 2 |
| Anti-aging agent 2 | 1 | 1 | 1 | 1 | 1 |
| Wax | 1 | 1 | 1 | 1 | 1 |
| Stearic acid | 2 | 2 | 2 | 2 | 2 |
| Zinc oxide | 3 | 3 | 3 | 3 | 3 |
| Vulcanization accelerator 1 | 2.4 | 2.4 |  | 2.4 | 2.4 |
| Vulcanization accelerator 2 |  |  | 2.4 |  |  |
| Insoluble sulfur | 2.2 | 2.2 | 2.2 | 2.2 | 2.2 |
| Total | 188.6 | 188.6 | 179.5 | 188.6 | 193.6 |
| Pure sulfur content | 1.76 | 1.76 | 1.76 | 1.76 | 1.76 |

TABLE 1-continued

| | | | | | |
|---|---|---|---|---|---|
| Accelerator/pure sulfur content (%) | 136 | 136 | 136 | 136 | 136 |
| Hs (170) | 70 | 71 | 70 | 67 | 74 |
| Hs (180) | 68 | 67 | 69 | 65 | 71 |
| Hs (170) - Hs (180) | 2 | 4 | 1 | 2 | 3 |
| Elongation at break | 110 | 115 | 115 | 120 | 95 |
| tan δ (60° C.) | 95 | 90 | 90 | 80 | 115 |
| RRC | 98 | 97 | 97 | 96 | 101 |

TABLE 2

| | Comparative Example 2 | Comparative Example 6 | Comparative Example 7 | Example 6 | Example 7 |
|---|---|---|---|---|---|
| NR | 50 | 50 | 50 | 50 | 50 |
| BR1 | 50 | 50 | 50 | 50 | 50 |
| BR2 | | | | | |
| BR3 | 50 | | | | |
| CB1 | | | | 40 | 40 |
| CB2 | 20 | 40 | | | |
| CB3 | | | 40 | | |
| CB4 | 60 | 30 | 30 | 30 | 30 |
| CB5 | | | | | |
| Oil | 1 | 5 | 5 | 5 | 5 |
| Anti-aging agent 1 | 2 | 2 | 2 | 2 | 2 |
| Anti-aging agent 2 | 1 | 1 | 1 | 1 | 1 |
| Wax | 1 | 1 | 1 | 1 | 1 |
| Stearic acid | 2 | 2 | 2 | 2 | 2 |
| Zinc oxide | 3 | 3 | 3 | 3 | 3 |
| Vulcanization accelerator 1 | 1.2 | 2.4 | 2.4 | 2.4 | 2.4 |
| Vulcanization accelerator 2 | | | | | |
| Insoluble sulfur | 3 | 2.2 | 2.2 | 2 | 2.7 |
| Total | 194.2 | 188.6 | 188.6 | 188.4 | 189.1 |
| Pure sulfur content | 2.4 | 1.76 | 1.76 | 1.6 | 2.16 |
| Accelerator/pure sulfur content (%) | 50 | 136 | 136 | 150 | 111 |
| Hs (170) | 70 | 70 | 68 | 69 | 72 |
| Hs (180) | 65 | 66 | 64 | 67 | 71 |
| Hs (170)-Hs (180) | 5 | 4 | 4 | 2 | 1 |
| Elongation at break | 100 | 115 | 120 | 115 | 100 |
| tan δ (60° C.) | 100 | 85 | 75 | 100 | 90 |
| RRC | 100 | 97 | 96 | 99 | 97 |

| | Comparative Example 8 | Comparative Example 9 | Example 8 | Example 9 |
|---|---|---|---|---|
| NR | 50 | 50 | 50 | 50 |
| BR1 | 50 | 50 | 50 | 50 |
| BR2 | | | | |
| BR3 | | | | |
| CB1 | 40 | 40 | 40 | 40 |
| CB2 | | | | |
| CB3 | | | | |
| CB4 | 30 | 30 | 30 | 30 |
| CB5 | | | | |
| Oil | 5 | 5 | 5 | 5 |
| Anti-aging agent 1 | 2 | 2 | 2 | 2 |
| Anti-aging agent 2 | | 1 | 1 | 1 |
| Wax | 1 | 1 | 1 | 1 |
| Stearic acid | 2 | 2 | 2 | 2 |
| Zinc oxide | 3 | 3 | 3 | 3 |
| Vulcanization accelerator 1 | 2.4 | 2.4 | 2 | 3.5 |
| Vulcanization accelerator 2 | | | | |
| Insoluble sulfur | 1.7 | 3 | 2.2 | 2.2 |
| Total | 188.1 | 189.4 | 188.2 | 189.7 |
| Pure sulfur content | 1.36 | 2.4 | 1.76 | 1.76 |
| Accelerator/pure sulfur content (%) | 176 | 100 | 114 | 199 |
| Hs (170) | 68 | 73 | 69 | 71 |
| Hs (180) | 66 | 72 | 67 | 71 |
| Hs (170)-Hs (180) | 2 | 1 | 2 | 0 |
| Elongation at break | 120 | 90 | 113 | 100 |

TABLE 2-continued

|  |  |  |  |  |
|---|---|---|---|---|
| tan δ (60° C.) | 105 | 85 | 100 | 85 |
| RRC | 101 | 97 | 100 | 97 |

|  | Comparative Example 10 | Comparative Example 11 | Comparative Example 12 | Comparative Example 13 |
|---|---|---|---|---|
| NR | 50 | 50 | 50 | 50 |
| BR1 | 50 | 50 | 50 | 50 |
| BR2 |  |  |  |  |
| BR3 |  |  |  |  |
| CB1 | 40 | 40 | 40 | 40 |
| CB2 |  |  |  |  |
| CB3 |  |  |  |  |
| CB4 | 30 | 30 |  |  |
| CB5 |  |  | 30 | 30 |
| Oil | 5 | 5 | 5 | 5 |
| Anti-aging agent 1 | 2 | 2 | 2 | 2 |
| Anti-aging agent 2 | 1 | 1 | 1 | 1 |
| Wax | 1 | 1 | 1 | 1 |
| Stearic acid | 2 | 2 | 2 | 2 |
| Zinc oxide | 3 | 3 | 3 | 3 |
| Vulcanization accelerator 1 | 1.8 | 4 | 2.4 | 2 |
| Vulcanization accelerator 2 |  |  |  |  |
| Insoluble sulfur | 2.2 | 2.2 | 2 | 2.2 |
| Total | 188 | 190.2 | 188.4 | 188.2 |
| Pure sulfur content | 1.76 | 1.76 | 1.6 | 1.76 |
| Accelerator/pure sulfur content (%) | 100 | 227 | 150 | 114 |
| Hs (170) | 68 | 73 | 68 | 68 |
| Hs (180) | 65 | 73 | 66 | 66 |
| Hs (170)-Hs (180) | 3 | 0 | 2 | 2 |
| Elongation at break | 120 | 90 | 124 | 122 |
| tan δ (60° C.) | 105 | 80 | 90 | 91 |
| RRC | 101 | 97 | 98 | 99 |

NR: STR20
BR1: Nipol BR1220, available from Zeon Corporation
BR2: UBEPOL BR130B, available from Ube Industries, Ltd.
BR3: UBEPOL BR360, available from Ube-made by Ube Industries, Ltd.
CB1: Show Black N234, available from Cabot Japan, nitrogen adsorption specific surface area (N2SA) = 123 m2/g)
CB2: Show Black N330T, available from Cabot Japan, nitrogen adsorption specific surface area (N2SA) = 71 m2/g)
CB3: Show Black N339, available from Cabot Japan, nitrogen adsorption specific surface area (N2SA) = 88 m2/g)
CB4: Show Black N550, available from Cabot Japan nitrogen adsorption specific surface area (N2SA) = 42 m2/g)
CB5: STERLING-V, available from Cabot Corporation, nitrogen adsorption specific surface area (N2SA) = 35 m2/g
Oil: Extract No. 4S, available from Showa Shell Sekiyu K.K.
Anti-aging agent 1: VULKANOX 4020, available from LANXESS K.K.
Anti-aging agent 1: VULKANOX HS/LG, available from LANXESS K.K.
Wax: OZOACE-0015A, available from Nippon Seiro Co., Ltd.
Stearic acid: Stearic acid 50S, available from New Japan Chemical Co., Ltd.
Zinc oxide: Zinc Oxide III, available from Seido Chemical Industry Co., Ltd.
Vulcanization accelerator 1: NOCCELER NS-P, available from Ouchi Shinko Chemical Industrial Co., Ltd.
Vulcanization accelerator 2: NOCCELER CZ-G, available from Ouchi Shinko Chemical Industrial Co., Ltd.
Insoluble sulfur: Crystex HS OT 20 (pure sulfur content: 80 mass %), available from FlexSys Inc.

As is evident from Table 1, since the rubber compositions prepared in Examples 1 to 9 each included two kinds of carbon black having specific nitrogen adsorption specific surface areas ($N_2SA$), sulfur, and a sulfenamide-based vulcanization accelerator in specific amounts in diene rubber having a specific composition, the vulcanization temperature dependency of physical properties of rubber was suppressed without deteriorating the heat build-up, and the hardness and the physical breakage properties improved at the same time, compared to the composition of Comparative Example 2.

In contrast, in Comparative Example 1, since the carbon black (2) was not included, the compounded amount of the pure sulfur content of Comparative Example 1 was greater than the upper limit specified in the present technology, and the compounded amount of the sulfenamide-based vulcanization accelerator relative to the pure sulfur content was less than the lower limit specified in the present technology, the temperature dependency of physical properties of rubber, heat build-up, and rolling resistance deteriorated.

In Comparative Example 2, since the carbon black (1) was not included, the compounded amount of the pure sulfur content was greater than the upper limit specified in the present technology, and the compounded amount of the sulfenamide-based vulcanization accelerator relative to the pure sulfur content was less than the lower limit specified in the present technology, the temperature dependency of the physical properties of rubber deteriorated, and neither the heat build-up nor physical breakage properties improved as much as in Examples.

In Comparative Example 3, since the compounded amount of the isoprene rubber was greater than the upper limit specified in the present technology, the temperature dependency of the physical properties of rubber deteriorated.

In Comparative Example 4, since the compounded amount of the carbon black (1) was less than the lower limit specified in the present technology, and the compounded amount of the carbon black (2) was greater than the upper limit specified in the present technology, the hardness decreased.

In Comparative Example 5, since the compounded amount of the carbon black (1) was greater than the upper limit specified in the present technology, and the compounded amount of the carbon black (2) was less than the lower limit specified in the present technology, the physical breakage properties and heat build-up deteriorated.

In Comparative Examples 6 and 7, since the carbon black (1) was not included, the temperature dependency of the physical properties of rubber deteriorated.

In Comparative Example 8, since the compounded amount of the pure sulfur component was less than the lower limit specified in the present technology, the heat build-up deteriorated.

In Comparative Example 9, since the compounded amount of the pure sulfur content was greater than the upper limit specified in the present technology, and the compounded amount of the sulfenamide-based vulcanization accelerator relative to the pure sulfur content was less than the lower limit specified in the present technology, the physical breakage properties deteriorated.

In Comparative Example 10, since the compounded amount of the sulfenamide-based vulcanization accelerator relative to the pure sulfur content was less than the lower limit specified in the present technology, the heat build-up deteriorated.

In Comparative Example 11, since the compounded amount of the sulfenamide-based vulcanization accelerator relative to the pure sulfur content was greater than the upper limit specified in the present technology, the physical breakage properties deteriorated.

In Comparative Examples 12 and 13, since the nitrogen adsorption specific surface area ($N_2SA$) of the carbon black (2) was less than the lower limit specified in the present technology, the hardness Hs (180) decreased.

The invention claimed is:

1. A tire rim cushion rubber composition comprising from 30 to 50 parts by mass of carbon black (1) having a nitrogen adsorption specific surface area of from 100 to 130 $m^2/g$, from 25 to 40 parts by mass of carbon black (2) having a nitrogen adsorption specific surface area of from 37 to 60 $m^2/g$, from 1.5 to 2.2 parts by mass of sulfur as a pure sulfur content, and from 110 to 200 mass % of a sulfenamide-based vulcanization accelerator relative to the pure sulfur content in 100 parts by mass of diene rubber containing from 30 to 60 parts by mass of isoprene rubber and from 40 to 70 parts by mass of polybutadiene homopolymer;
wherein an elongation at break at room temperature of a vulcanized rubber obtained by vulcanizing the tire rim cushion rubber composition is from 100 to 120.

2. The tire rim cushion rubber composition according to claim 1, wherein a hardness Hs (170) when the tire rim cushion rubber composition is vulcanized for 10 minutes at 170° C. is from 68 to 72, a hardness Hs (180) when the tire rim cushion rubber composition is vulcanized for 10 minutes at 180° C. is from 67 to 71, and a difference between the Hs (170) and the Hs (180) is 3 or less.

3. The tire rim cushion rubber composition according to claim 1, which comprises from 40 to 60 parts by mass of the isoprene rubber and from 40 to 60 parts by mass of the polybutadiene homopolymer when a total amount of the diene rubber is 100 parts by mass.

4. The tire rim cushion rubber composition according to claim 1, wherein the nitrogen adsorption specific surface area of the carbon black (1) is from 115 to 125 $m^2/g$.

5. The tire rim cushion rubber composition according to claim 1, wherein the nitrogen adsorption specific surface area of the carbon black (2) is from 40 to 49 $m^2/g$.

6. The tire rim cushion rubber composition according to claim 1, wherein the sulfenamide-based vulcanization accelerator is N-cyclohexyl-2-benzothiazolyl sulfenamide, N-tert-butyl-2-benzothiazolyl sulfenamide, or N,N'-dicyclohexyl-2-benzothiazolyl sulfenamide.

7. The tire rim cushion rubber composition according to claim 1, comprising from 30 to 45 parts by mass of the carbon black (1) in 100 parts by mass of the diene rubber.

8. The tire rim cushion rubber composition according to claim 1, comprising from 25 to 35 parts by mass of the carbon black (2) in 100 parts by mass of the diene rubber.

9. A pneumatic tire comprising the tire rim cushion rubber composition described in claim 1 in a rim cushion.

10. A tire rim cushion rubber composition comprising from 30 to 50 parts by mass of carbon black (1) having a nitrogen adsorption specific surface area of from 100 to 130 $m^2/g$, from 25 to 40 parts by mass of carbon black (2) having a nitrogen adsorption specific surface area of from 37 to 60 $m^2/g$, from 1.5 to 2.2 parts by mass of sulfur as a pure sulfur content, and from 110 to 200 mass % of a sulfenamide-based vulcanization accelerator relative to the pure sulfur content in 100 parts by mass of diene rubber containing from 30 to 60 parts by mass of isoprene rubber and from 40 to 70 parts by mass of polybutadiene homopolymer;
wherein a tan δ at 10% initial strain, +/−2% amplitude, 20 Hz frequency, and 60° C. temperature of a vulcanized rubber obtained by vulcanizing the tire rim cushion rubber composition is from 90 to 100.

11. A tire rim cushion rubber composition comprising from 30 to 50 parts by mass of carbon black (1) having a nitrogen adsorption specific surface area of from 100 to 130 $m^2/g$, from 25 to 40 parts by mass of carbon black (2) having a nitrogen adsorption specific surface area of from 37 to 60 $m^2/g$, from 1.5 to 2.2 parts by mass of sulfur as a pure sulfur content, and from 110 to 200 mass % of a sulfenamide-based vulcanization accelerator relative to the pure sulfur content in 100 parts by mass of diene rubber containing from 30 to 60 parts by mass of isoprene rubber and from 40 to 70 parts by mass of polybutadiene homopolymer;
wherein a rolling resistance of the tire rim cushion rubber composition expressed as an index value with respect to a reference index value of 100, tested at 80 km/h in accordance with JIS D4324:2009 and conditions for a passenger vehicle, is from 97-99, wherein the reference index value is based on a reference rubber obtained from a reference rubber composition comprising:
20 parts by mass of a first reference carbon black having a nitrogen adsorption specific surface area of 71 $m^2/g$, 60 parts by mass of a second reference carbon black having a nitrogen adsorption specific surface area of 42 $m^2/g$, 2.4 parts by mass of sulfur as a reference pure sulfur content, and 50 mass % of a reference sulfenamide-based vulcanization accelerator relative to the reference pure sulfur content in 100 parts by mass of a reference diene rubber containing 50 parts by mass of a reference isoprene rubber and 50 parts by mass of a reference polybutadiene homopolymer.

* * * * *